US012704481B2

(12) United States Patent
Gitzel et al.

(10) Patent No.: US 12,704,481 B2
(45) Date of Patent: Aug. 11, 2026

(54) FAULT STATE DETECTION APPARATUS

(71) Applicant: ABB Schweiz AG, Baden (CH)

(72) Inventors: Ralf Gitzel, Mannheim (DE); Stephan Wildermuth, Laudenbach (DE); Joerg Gebhardt, Mainz (DE); Joerg Ostrowski, Zürich (CH); Patrik Reto Kaufmann, Baden (CH)

(73) Assignee: ABB Schweiz AG, Baden (CH)

( * ) Notice: Subject to any disclaimer, the term of this patent is extended or adjusted under 35 U.S.C. 154(b) by 463 days.

(21) Appl. No.: 17/970,797

(22) Filed: Oct. 21, 2022

(65) Prior Publication Data

US 2023/0043212 A1 Feb. 9, 2023

Related U.S. Application Data

(63) Continuation of application No. PCT/EP2021/059141, filed on Apr. 8, 2021.

(30) Foreign Application Priority Data

Apr. 22, 2020 (EP) .................................... 20170749

(51) Int. Cl.

*G01N 29/12* (2006.01)
*G01J 5/00* (2022.01)
(Continued)

(52) U.S. Cl.

CPC ................ *G01N 29/12* (2013.01); *G01J 5/10* (2013.01); *G06T 7/0004* (2013.01); (Continued)

(58) Field of Classification Search

None
See application file for complete search history.

(56) References Cited

U.S. PATENT DOCUMENTS

2013/0167619 A1* 7/2013 Spasova .................. F22B 37/38 73/40.5 A
2013/0253850 A1* 9/2013 Aulanko ................ G01H 1/003 702/33

(Continued)

FOREIGN PATENT DOCUMENTS

| | | | |
|---|---|---|---|
| CN | 101027617 | A | 8/2007 |
| CN | 110334740 | A | 10/2019 |
| CN | 110455397 | A | 11/2019 |

OTHER PUBLICATIONS

Yan et al., "Generative adversarial network for fault detection diagnosis of chillers," *Building and Environment*, 172, 11 pp. (Apr. 2020).

(Continued)

*Primary Examiner* — Huy Q Phan
*Assistant Examiner* — Carl F. R. Tchatchouang
(74) *Attorney, Agent, or Firm* — Fitch Even Tabin & Flannery LLP

(57) ABSTRACT

A fault state detection apparatus includes an input unit and a processing unit. The input unit receives condition monitoring data. The processing unit implements a trained machine learning algorithm to analyze the received condition monitoring data to determine if the received condition monitoring data is associated with a fault state. The trained machine learning algorithm was trained on the basis of a plurality of non-fault state condition monitoring data and associated ground truth information and on the basis of a plurality of fault state condition monitoring data and associated ground truth information. A subset of the plurality of fault state condition monitoring data was generated from one or more non-fault state condition monitoring data. Generation of fault state conditioning monitoring data in the subset of the plurality of fault state condition monitoring data (Continued)

comprises a transformation of non-fault state condition monitoring data to fault state condition monitoring data.

12 Claims, 2 Drawing Sheets

(51) Int. Cl.
*G01J 5/10* (2006.01)
*G06T 7/00* (2017.01)

(52) U.S. Cl.
CPC ................ *G01J 2005/0077* (2013.01); *G01N 2291/0289* (2013.01); *G06T 2207/10048* (2013.01); *G06T 2207/20081* (2013.01)

(56) References Cited

U.S. PATENT DOCUMENTS

2014/0176152 A1* 6/2014 Wolbank ................ G01R 31/50 324/510
2016/0327600 A1* 11/2016 Pamulaparthy .......... H02H 7/04
2018/0284741 A1 10/2018 Cella et al.
2019/0156154 A1* 5/2019 Tu ......................... G06V 10/82
2019/0370696 A1* 12/2019 Ezen Can .............. G06N 5/025
2020/0193591 A1* 6/2020 Kamiyama ............... G06T 7/60
2023/0125477 A1* 4/2023 Gurumurthy ............ G06N 3/08 382/103

OTHER PUBLICATIONS

European Patent Office, Extended European Search Report in European Patent Application No. 20170749.4, 11 pp. (Oct. 2, 2020).
European Patent Office, International Search Report in International Patent Application No. PCT/EP2021/059141, 6 pp. (Jun. 16, 2021).
European Patent Office, Written Opinion in International Patent Application No. PCT/EP2021/059141, 7 pp. (Jun. 16, 2021).
The Patent Office of the People's Republic of China, Office Action in Chinese Patent Application No. 202180029914.9, 9 pp. (Feb. 8, 2025).

* cited by examiner

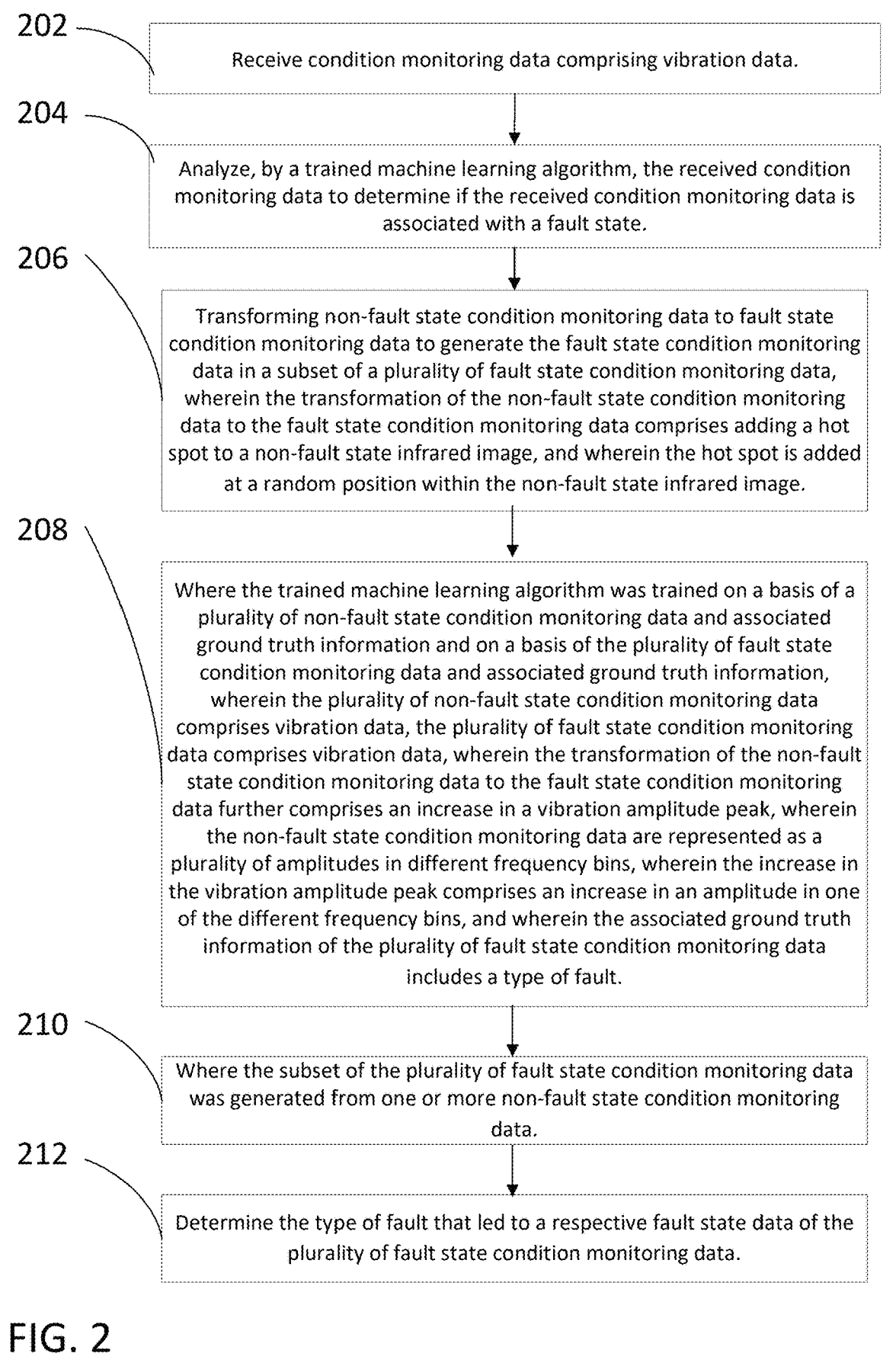

202 — Receive condition monitoring data comprising vibration data.

204 — Analyze, by a trained machine learning algorithm, the received condition monitoring data to determine if the received condition monitoring data is associated with a fault state.

206 — Transforming non-fault state condition monitoring data to fault state condition monitoring data to generate the fault state condition monitoring data in a subset of a plurality of fault state condition monitoring data, wherein the transformation of the non-fault state condition monitoring data to the fault state condition monitoring data comprises adding a hot spot to a non-fault state infrared image, and wherein the hot spot is added at a random position within the non-fault state infrared image.

208 — Where the trained machine learning algorithm was trained on a basis of a plurality of non-fault state condition monitoring data and associated ground truth information and on a basis of the plurality of fault state condition monitoring data and associated ground truth information, wherein the plurality of non-fault state condition monitoring data comprises vibration data, the plurality of fault state condition monitoring data comprises vibration data, wherein the transformation of the non-fault state condition monitoring data to the fault state condition monitoring data further comprises an increase in a vibration amplitude peak, wherein the non-fault state condition monitoring data are represented as a plurality of amplitudes in different frequency bins, wherein the increase in the vibration amplitude peak comprises an increase in an amplitude in one of the different frequency bins, and wherein the associated ground truth information of the plurality of fault state condition monitoring data includes a type of fault.

210 — Where the subset of the plurality of fault state condition monitoring data was generated from one or more non-fault state condition monitoring data.

212 — Determine the type of fault that led to a respective fault state data of the plurality of fault state condition monitoring data.

FIG. 2

FAULT STATE DETECTION APPARATUS

CROSS-REFERENCE TO RELATED APPLICATIONS

This patent application claims priority to International Patent Application No. PCT/EP2021/059141, filed on Apr. 8, 2021, which claims priority to European Patent Application No. 20170749.4, filed on Apr. 22, 2020, each of which is incorporated herein in its entirety by reference.

FIELD OF THE DISCLOSURE

The present disclosure relates to a fault state detection apparatus, a method of fault state detection, and a method of training a machine learning algorithm for a fault state detection apparatus.

BACKGROUND OF THE INVENTION

Condition monitoring data such as vibration measurements, infrared images, or current values, can be used to train artificial intelligence (AI) systems to automatically detect or even predict faulty states. However, typically, the amount of healthy data far outweighs the examples which correspond to faulty cases. This class imbalance has a negative effect on the performance of machine learning algorithms and other related approaches. In order to improve the performance, we need to circumvent the impact of class imbalance in the original (training) data. However, this is difficult to achieve.

BRIEF SUMMARY OF THE INVENTION

The present disclosure describes an improved technique to detect system faults based on measurement data from such systems.

In one aspect, the present disclosure describes a fault state detection apparatus, comprising: an input unit; and a processing unit.

In one embodiment, the input unit is configured to receive condition monitoring data. The processing unit is configured to implement a trained machine learning algorithm to analyze the received condition monitoring data to determine if the received condition monitoring data is associated with a fault state. The trained machine learning algorithm was trained on the basis of a plurality of non-fault state condition monitoring data and associated ground truth information and on the basis of a plurality of fault state condition monitoring data and associated ground truth information. A subset of the plurality of fault state condition monitoring data was generated from one or more non-fault state condition monitoring data. Generation of fault state conditioning monitoring data in the subset of the plurality of fault state condition monitoring data comprises a transformation of non-fault state condition monitoring data to fault state condition monitoring data.

BRIEF DESCRIPTION OF THE SEVERAL VIEWS OF THE DRAWING(S)

FIG. 2 is an exemplary flowchart of a method for fault state detection, in accordance with the disclosure.

DETAILED DESCRIPTION OF THE INVENTION

Figure 1:
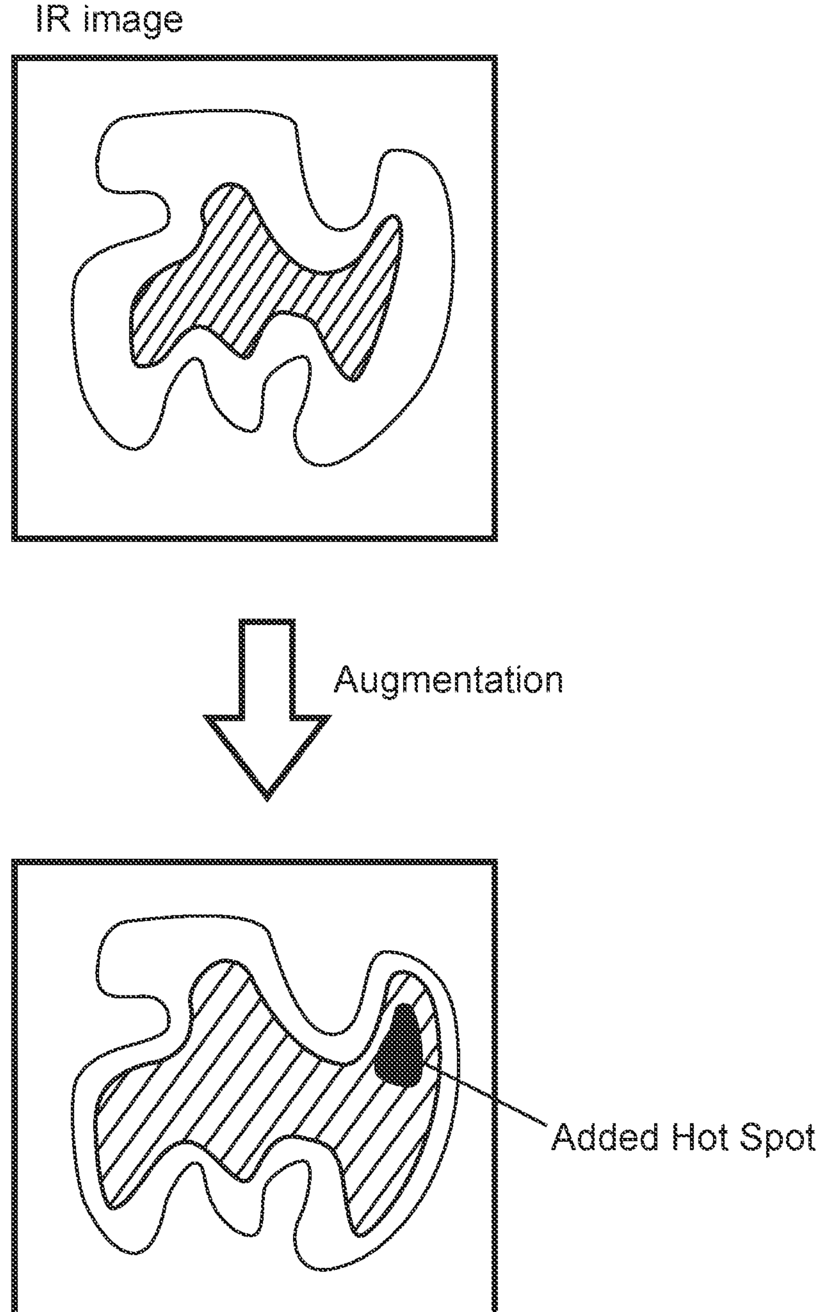
FIG. 1 is a schematic of a hot spot added to an infrared image of a piece of equipment operating normally to transform the image to one associated with normal operation to one associated with faulty operation, in accordance with the disclosure.

FIG. 1 relates to data useable with a fault state detection apparatus, a method of fault state detection, and a method of training a machine learning algorithm for a fault state detection apparatus.

According to an example of a fault state detection apparatus, the fault state detection apparatus comprises an input unit, and a process unit. The input unit is configured to receive condition monitoring data (202 of FIG. 2). The processing unit is configured to implement a trained machine learning algorithm to analyse the received condition monitoring data to determine if the received condition monitoring data is associated with a fault state (204 of FIG. 2). The trained machine learning algorithm was trained on the basis of a plurality of non-fault state condition monitoring data and associated ground truth information and on the basis of a plurality of fault state condition monitoring data and associated ground truth information (208 of FIG. 2). A subset of the plurality of fault state condition monitoring data was generated from one or more non-fault state condition monitoring data (210 of FIG. 2). Generation of fault state conditioning monitoring data in the subset of the plurality of fault state condition monitoring data comprises a transformation of non-fault state condition monitoring data to fault state condition monitoring data (206 of FIG. 2).

In an example, the apparatus is configured to output an indication that the received condition monitoring data is associated with a fault state.

In an example, the trained machine learning algorithm is a neural network.

In an example, the trained machine learning algorithm is a decision tree algorithm.

According to an example, the received condition monitoring data comprises vibration data and the plurality of non-fault state condition monitoring data comprises vibration data and the plurality of fault state condition monitoring data comprises vibration data (208 of FIG. 2). The transformation of the non-fault state condition monitoring data to the fault state condition monitoring data can comprise an increase in a vibration amplitude peak (208 of FIG. 2).

According to an example, the non-fault state condition monitoring data are represented as a plurality of amplitudes in different frequency bins (208 of FIG. 2). The increase in the vibration amplitude peak can comprise an increase in the amplitude in one of the different frequency bins (208 of FIG. 2).

According to an example, the received condition monitoring data comprises vibration data and the plurality of non-fault state condition monitoring data comprises vibration data and the plurality of fault state condition monitoring data comprises vibration data. The transformation of the non-fault state condition monitoring data to fault state condition monitoring data can comprise a decrease in a vibration amplitude peak.

According to an example, the non-fault state condition monitoring data are represented as a plurality of amplitudes in different frequency bins. The decrease in the vibration amplitude peak can comprise a decrease in the amplitude in one of the different frequency bins.

According to an example, the received condition monitoring data comprises vibration data and the plurality of non-fault state condition monitoring data comprises vibration data and the plurality of fault state condition monitoring data comprises vibration data. The transformation of the non-fault state condition monitoring data to fault state condition monitoring data can comprise a shift in a vibration amplitude peak.

According to an example, the non-fault state condition monitoring data are represented as a plurality of amplitudes in different frequency bins. The shift in the vibration amplitude peak can comprise an increase in the amplitude in a first one of the different frequency bins and an associated decrease in the amplitude in a second one of the different frequency bins.

According to an example, the transformation of the non-fault state condition monitoring data to the fault state condition monitoring data comprises a preservation of a total vibrational energy.

According to an example, the transformation of the non-fault state condition monitoring data to the fault state condition monitoring data comprises a change of a total vibrational energy.

According to an example, the received condition monitoring data comprises infrared image data and the plurality of non-fault state condition monitoring data comprises infrared image data and the plurality of fault state condition monitoring data comprises infrared image data. The transformation of the non-fault state condition monitoring data to the fault state condition monitoring data can comprise an addition of a hot spot to a non-fault state infrared image (206 of FIG. 2).

According to an example, the hot spot is added at a random position within the non-fault state infrared image (206 of FIG. 2).

According to an example, the hot spot is added at a position within the non-fault state infrared image associated with a conductive part of an imaged object.

According to an example, the received condition monitoring data comprises visible image data and the plurality of non-fault state condition monitoring data comprises visible image data and the plurality of fault state condition monitoring data comprises visible image data. The transformation of the non-fault state condition monitoring data to the fault state condition monitoring data can comprise an addition of a scratch or dent to an object in a non-fault state visible image.

In an example, the received condition monitoring data comprises current data and the plurality of non-fault state condition monitoring data comprises current data and the plurality of fault state condition monitoring data comprises current data. The transformation of the non-fault state condition monitoring data to the fault state condition monitoring data can comprise a variation in a current value in non-fault state current data.

In an example, the received condition monitoring data comprises voltage data and the plurality of non-fault state condition monitoring data comprises voltage data and the plurality of fault state condition monitoring data comprises voltage data. The transformation of the non-fault state condition monitoring data to the fault state condition monitoring data can comprise a variation in a voltage value in non-fault state voltage data.

According to a method of fault state detection, the method comprises: receiving by an input unit condition monitoring data; analysing by a trained machine learning algorithm implemented by a processing unit the received condition monitoring data to determine if the received condition monitoring data is associated with a fault state; wherein, the trained machine learning algorithm was trained on the basis of a plurality of non-fault state condition monitoring data and associated ground truth information and on the basis of a plurality of fault state condition monitoring data and associated ground truth information; wherein, a subset of the plurality of fault state condition monitoring data was generated from one or more non-fault state condition monitoring data, and wherein, generation of fault state conditioning monitoring data in the subset of the plurality of fault state condition monitoring data comprises a transformation of non-fault state condition monitoring data to fault state condition monitoring data.

In an example, the trained machine learning algorithm is a neural network.

In an example, the trained machine learning algorithm is a decision tree algorithm.

In an example, the received condition monitoring data comprises vibration data and the plurality of non-fault state condition monitoring data comprises vibration data and the plurality of fault state condition monitoring data comprises vibration data. The transformation of the non-fault state condition monitoring data to the fault state condition monitoring data can comprise an increase in a vibration amplitude peak.

In an example, the non-fault state condition monitoring data are represented as a plurality of amplitudes in different frequency bins. The increase in the vibration amplitude peak can comprise an increase in the amplitude in one of the different frequency bins.

In an example, the condition monitoring data comprises vibration data and the plurality of non-fault state condition monitoring data comprises vibration data and the plurality of fault state condition monitoring data comprises vibration data. The transformation of the non-fault state condition monitoring data to fault state condition monitoring data can comprise a decrease in a vibration amplitude peak.

In an example, the non-fault state condition monitoring data are represented as a plurality of amplitudes in different frequency bins. The decrease in the vibration amplitude peak can comprise a decrease in the amplitude in one of the different frequency bins.

In an example, the received condition monitoring data comprises vibration data and the plurality of non-fault state condition monitoring data comprises vibration data and the plurality of fault state condition monitoring data comprises vibration data. The transformation of the non-fault state condition monitoring data to fault state condition monitoring data can comprise a shift in a vibration amplitude peak.

In an example, the non-fault state condition monitoring data are represented as a plurality of amplitudes in different frequency bins. The shift in the vibration amplitude peak can comprise an increase in the amplitude in a first one of the different frequency bins and an associated decrease in the amplitude in a second one of the different frequency bins.

In an example, the transformation of the non-fault state condition monitoring data to the fault state condition monitoring data comprises a preservation of a total vibrational energy.

In an example, the transformation of the non-fault state condition monitoring data to the fault state condition monitoring data comprises a change of a total vibrational energy.

In an example, the received condition monitoring data comprises infrared image data and the plurality of non-fault state condition monitoring data comprises infrared image data and the plurality of fault state condition monitoring data comprises infrared image data. The transformation of the non-fault state condition monitoring data to the fault state condition monitoring data can comprise an addition of a hot spot to a non-fault state infrared image.

In an example, the hot spot is added at a random position within the non-fault state infrared image.

In an example, the hot spot is added at a position within the non-fault state infrared image associated with a conductive part of an imaged object.

In an example, the received condition monitoring data comprises visible image data and the plurality of non-fault state condition monitoring data comprises visible image data and the plurality of fault state condition monitoring data comprises visible image data. The transformation of the non-fault state condition monitoring data to the fault state condition monitoring data can comprise an addition of a scratch or dent to a an object in a non-fault state visible image.

In an example, the received condition monitoring data comprises current data and the plurality of non-fault state condition monitoring data comprises current data and the plurality of fault state condition monitoring data comprises current data. The transformation of the non-fault state condition monitoring data to the fault state condition monitoring data can comprise a variation in a current value in non-fault state current data.

In an example, the received condition monitoring data comprises voltage data and the plurality of non-fault state condition monitoring data comprises voltage data and the plurality of fault state condition monitoring data comprises voltage data. The transformation of the non-fault state condition monitoring data to the fault state condition monitoring data can comprise a variation in a voltage value in non-fault state voltage data.

According to a method of training a machine learning algorithm for a fault state detection apparatus, the method comprises: providing a plurality of non-fault state condition monitoring data and associated ground truth information; providing a plurality of fault state condition monitoring data and associated ground truth information, the providing comprising generating a subset of the plurality of fault state condition monitoring data from one or more non-fault state condition monitoring data, and wherein the generating of fault state conditioning monitoring data in the subset of the plurality of fault state condition monitoring data comprises transforming non-fault state condition monitoring data to fault state condition monitoring data; implementing a machine learning algorithm on a processing unit; and training the machine learning algorithm on the basis of the plurality of non-fault state condition monitoring data and the associated ground truth information and on the basis of the plurality of fault state condition monitoring data and the associated ground truth information.

In an example, the machine learning algorithm is a neural network.

In an example, the machine learning algorithm is a decision tree algorithm.

In an example, the plurality of non-fault state condition monitoring data comprises vibration data and the plurality of fault state condition monitoring data comprises vibration data. The transforming the non-fault state condition monitoring data to the fault state condition monitoring data can comprise an increase in a vibration amplitude peak.

In an example, the non-fault state condition monitoring data are represented as a plurality of amplitudes in different frequency bins. The increase in the vibration amplitude peak can comprise an increase in the amplitude in one of the different frequency bins.

In an example, the plurality of non-fault state condition monitoring data comprises vibration data and the plurality of fault state condition monitoring data comprises vibration data. The transforming the non-fault state condition monitoring data to fault state condition monitoring data can comprise a decrease in a vibration amplitude peak.

In an example, the non-fault state condition monitoring data are represented as a plurality of amplitudes in different frequency bins. The decrease in the vibration amplitude peak can comprise a decrease in the amplitude in one of the different frequency bins.

In an example, the plurality of non-fault state condition monitoring data comprises vibration data and the plurality of fault state condition monitoring data comprises vibration data. The transforming the non-fault state condition monitoring data to fault state condition monitoring data can comprise a shift in a vibration amplitude peak.

In an example, the non-fault state condition monitoring data are represented as a plurality of amplitudes in different frequency bins. The shift in the vibration amplitude peak can comprise an increase in the amplitude in a first one of the different frequency bins and an associated decrease in the amplitude in a second one of the different frequency bins.

In an example, the transforming the non-fault state condition monitoring data to the fault state condition monitoring data comprises a preservation of a total vibrational energy.

In an example, the transforming the non-fault state condition monitoring data to the fault state condition monitoring data comprises a change of a total vibrational energy.

In an example, the plurality of non-fault state condition monitoring data comprises infrared image data and the plurality of fault state condition monitoring data comprises infrared image data. The transforming the non-fault state condition monitoring data to the fault state condition monitoring data can comprise an addition of a hot spot to a non-fault state infrared image.

In an example, the hot spot is added at a random position within the non-fault state infrared image.

In an example, the hot spot is added at a position within the non-fault state infrared image associated with a conductive part of an imaged object.

In an example, the plurality of non-fault state condition monitoring data comprises visible image data and the plurality of fault state condition monitoring data comprises visible image data. The transforming the non-fault state condition monitoring data to the fault state condition monitoring data can comprise an addition of a scratch or dent to a an object in a non-fault state visible image.

In an example, the plurality of non-fault state condition monitoring data comprises current data and the plurality of fault state condition monitoring data comprises current data. The transforming the non-fault state condition monitoring data to the fault state condition monitoring data can comprise a variation in a current value in non-fault state current data.

In an example, the plurality of non-fault state condition monitoring data comprises voltage data and the plurality of fault state condition monitoring data comprises voltage data. The transforming the non-fault state condition monitoring data to the fault state condition monitoring data can comprise a variation in a voltage value in non-fault state voltage data.

Thus, in order to address training data imbalance, data that resembles the faulty case is generated and used to augment the training data. The generated faulty cases are then a “superset” of all possible failures. Additionally, there might even be some “failure patterns” which will never occur in real life in the data. However, the failure mechanism does not need to be fully understood as long as the basic principles ("Shotgun approach") are understood, and if training data is used that will not actually be seen in real life, then this does not matter, because the trained machine learning algorithm will not assign this non-real life generated data to actual data being measured. What is important is that the trained data, associated with faults, has enough real-life faulty data. Thus, real faulty data can be used and faulty data generated from real data can be inspected by a human if necessary to validate that it is data that could be associated with a real fault.

This new concept can also be explained through the following examples:

Vibration data consists of a list of amplitudes for different frequency bins. The healthy data can be changed by reducing and/or increasing specific bins. The total amount of energy can be preserved or not. It is known that failures manifest as increased peaks, sometimes accompanied by shifting peaks. There are strong physical arguments for changes in specific peaks corresponding to specific failure mechanisms. These rules can be considered but can be simplified for the purpose of data generation. Thus, the real failures will be a subset of all generated cases. However, since the "unrealistic" failures never occur, they do not negatively impact the performance of the system.

IR images can be used to monitor hot spots in electrical systems. Detecting hot spots and distinguishing them from normal heat up is easy for humans. For AI systems, it is a task of image recognition. One way to generate faulty data is to add visually convincing hot spots to images taken of the system under surveillance randomly. In FIG. 1, a healthy image is taken. An augmentation algorithm takes this image as input, selects a random spot (possibly with some guidance) and adds a hot spot through non-homogeneously adding values to the local temperature. While not all hot spots will correspond to realistic failure situations (for example a hot spot might show up on a non-conductive area), the algorithm will learn what it has to look for.

Also, current and voltage data can similarly be used to modify non-faulty data to augment healthy data to be used in training the machine learning algorithm that is then used for fault detection.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

Thus, an artificial-intelligence-based approach is developed that takes examples of healthy condition monitoring data as input. This input is transformed into examples of faulty condition monitoring data. This reduces the class imbalance between healthy and faulty examples that is very common in condition monitoring data, because normally data associated with healthy operation far outweighs data associated with faulty operation, and now this imbalance is mitigated in a completely new way to provide for better machine learning fault detection determination. In other words, the balanced data provides for better training results than an imbalanced version.

Here, the ground truth information relates to whether the data is associated with a non-fault state or associated with a fault state. The ground truth data associated with the fault state, can also detail the type of fault (208 and 212 of FIG. 2). Thus, the apparatus can in certain embodiments not only determine is acquired data is associated with healthy operation or with faulty operation, but if associated with faulty operation can also determine the type of fault that has led to the faulty data (208 and 212 of FIG. 2).

In an example, the received condition monitoring data comprises vibration data and the plurality of non-fault state condition monitoring data comprises vibration data and the plurality of fault state condition monitoring data comprises vibration data. The transformation of the non-fault state condition monitoring data to the fault state condition monitoring data can then comprise an increase in a vibration amplitude peak.

In an example, the non-fault state condition monitoring data are represented as a plurality of amplitudes in different frequency bins. The increase in the vibration amplitude peak can comprise an increase in the amplitude in one of the different frequency bins.

In an example, the received condition monitoring data comprises vibration data and the plurality of non-fault state condition monitoring data comprises vibration data and the plurality of fault state condition monitoring data comprises vibration data. The transformation of the non-fault state condition monitoring data to fault state condition monitoring data can comprise a decrease in a vibration amplitude peak.

In an example, the non-fault state condition monitoring data are represented as a plurality of amplitudes in different frequency bins. The decrease in the vibration amplitude peak can comprise a decrease in the amplitude in one of the different frequency bins.

In an example, the received condition monitoring data comprises vibration data and the plurality of non-fault state condition monitoring data comprises vibration data and the plurality of fault state condition monitoring data comprises vibration data. The transformation of the non-fault state condition monitoring data to fault state condition monitoring data can comprise a shift in a vibration amplitude peak.

In an example, the non-fault state condition monitoring data are represented as a plurality of amplitudes in different frequency bins. The shift in the vibration amplitude peak can comprise an increase in the amplitude in a first one of the different frequency bins and an associated decrease in the amplitude in a second one of the different frequency bins.

In an example, the transformation of the non-fault state condition monitoring data to the fault state condition monitoring data comprises a preservation of a total vibrational energy.

In an example, the transformation of the non-fault state condition monitoring data to the fault state condition monitoring data comprises a change of a total vibrational energy.

In an example, the received condition monitoring data comprises infrared image data and the plurality of non-fault state condition monitoring data comprises infrared image data and the plurality of fault state condition monitoring data comprises infrared image data. The transformation of the non-fault state condition monitoring data to the fault state condition monitoring data can comprise an addition of a hot spot to a non-fault state infrared image.

In an example, the hot spot is added at a random position within the non-fault state infrared image.

In an example, the hot spot is added at a position within the non-fault state infrared image associated with a conductive part of an imaged object.

In an example, the received condition monitoring data comprises visible image data and the plurality of non-fault state condition monitoring data comprises visible image data and the plurality of fault state condition monitoring data comprises visible image data. The transformation of the non-fault state condition monitoring data to the fault state condition monitoring data can comprise an addition of a scratch or dent to an object in a non-fault state visible image.

In a second aspect, there is provided a method of fault state detection, comprising: receiving by an input unit condition monitoring data; and analyzing by a trained machine learning algorithm implemented by a processing unit the received condition monitoring data to determine if the received condition monitoring data is associated with a fault state.

The trained machine learning algorithm was trained on the basis of a plurality of non-fault state condition monitoring data and associated ground truth information and on the basis of a plurality of fault state condition monitoring data and associated ground truth information. A subset of the plurality of fault state condition monitoring data was generated from one or more non-fault state condition monitoring data. Generation of fault state conditioning monitoring data in the subset of the plurality of fault state condition monitoring data comprises a transformation of non-fault state condition monitoring data to fault state condition monitoring data.

In a third aspect, there is provided a method of training a machine learning algorithm for a fault state detection apparatus, the method comprising: providing a plurality of non-fault state condition monitoring data and associated ground truth information; providing a plurality of fault state condition monitoring data and associated ground truth information, the providing comprising generating a subset of the plurality of fault state condition monitoring data from one or more non-fault state condition monitoring data, and wherein the generating of fault state conditioning monitoring data in the subset of the plurality of fault state condition monitoring data comprises transforming non-fault state condition monitoring data to fault state condition monitoring data; implementing a machine learning algorithm on a processing unit; and training the machine learning algorithm on the basis of the plurality of non-fault state condition monitoring data and the associated ground truth information and on the basis of the plurality of fault state condition monitoring data and the associated ground truth information.

All references, including publications, patent applications, and patents, cited herein are hereby incorporated by reference to the same extent as if each reference were individually and specifically indicated to be incorporated by reference and were set forth in its entirety herein.

The use of the terms “a” and “an” and “the” and “at least one” and similar referents in the context of describing the invention (especially in the context of the following claims) are to be construed to cover both the singular and the plural, unless otherwise indicated herein or clearly contradicted by context. The use of the term “at least one” followed by a list of one or more items (for example, “at least one of A and B”) is to be construed to mean one item selected from the listed items (A or B) or any combination of two or more of the listed items (A and B), unless otherwise indicated herein or clearly contradicted by context. The terms “comprising,” “having,” “including,” and “containing” are to be construed as open-ended terms (i.e., meaning “including, but not limited to,”) unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., “such as”) provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for fault state detection, comprising:

by a sensor, obtaining a non-fault state infrared image, transmitting the non-fault state infrared image to a trained machine learning algorithm, and receiving the non-fault state infrared image by the trained machine learning algorithm;

receiving condition monitoring data comprising vibration data;

analyzing, by the trained machine learning algorithm, the received condition monitoring data to determine if the received condition monitoring data is associated with a fault state;

transforming non-fault state condition monitoring data to fault state condition monitoring data to generate the fault state condition monitoring data in a subset of a plurality of fault state condition monitoring data, wherein the transformation of the non-fault state condition monitoring data to the fault state condition monitoring data comprises adding a hot spot to the non-fault state infrared image, and wherein the hot spot is added at a random position within the non-fault state infrared image and alters the non-fault state infrared image, wherein, the trained machine learning algorithm was trained on a basis of training data sets including a plurality of non-fault state condition monitoring data and associated ground truth information and on a basis of the plurality of fault state condition monitoring data and associated ground truth information and wherein the training data sets mitigated imbalances between training data reflecting healthy operations and training data representing faulty operations, wherein the plurality of non-fault state condition monitoring data comprises vibration data, the plurality of fault state condition monitoring data comprises vibration data, wherein the transformation of the non-fault state condition monitoring data to the fault state condition monitoring data further comprises increasing a vibration amplitude peak, wherein the non-fault state condition monitoring data are represented as a plurality of amplitudes in different frequency bins, wherein increasing the vibration amplitude peak comprises increasing an amplitude in one of the different frequency bins, and wherein the associated ground truth information of the plurality of fault state condition monitoring data includes a type of fault;

wherein, the subset of the plurality of fault state condition monitoring data was generated from one or more non-fault state condition monitoring data, and determining the type of fault that led to a respective fault state data of the plurality of fault state condition monitoring data.

2. The method according to claim 1, wherein the received condition monitoring data comprises the vibration data and the plurality of non-fault state condition monitoring data comprises the vibration data and the plurality of fault state condition monitoring data comprises the vibration data, and wherein the transformation of the non-fault state condition monitoring data to fault state condition monitoring data comprises a decrease in the vibration amplitude peak.

3. The method according to claim 2, wherein the non-fault state condition monitoring data are represented as a plurality of amplitudes in the different frequency bins, and wherein the decrease in the vibration amplitude peak comprises a decrease in the amplitude in one of the different frequency bins.

4. The method according to claim 1, wherein the received condition monitoring data comprises the vibration data and the plurality of non-fault state condition monitoring data comprises the vibration data and the plurality of fault state condition monitoring data comprises the vibration data, and wherein the transformation of the non-fault state condition monitoring data to fault state condition monitoring data comprises a shift in the vibration amplitude peak.

5. The method according to claim 4, wherein the non-fault state condition monitoring data are represented as a plurality of amplitudes in the different frequency bins, and wherein the shift in the vibration amplitude peak comprises an increase in the amplitude in a first one of the different frequency bins and an associated decrease in the amplitude in a second one of the different frequency bins.

6. The method according to claim 1, wherein the transformation of the non-fault state condition monitoring data to the fault state condition monitoring data comprises a preservation of a total vibrational energy.

7. The method according to claim 1, wherein the transformation of the non-fault state condition monitoring data to the fault state condition monitoring data comprises a change of a total vibrational energy.

8. The method according to claim 1, wherein the received condition monitoring data comprises infrared image data and the plurality of non-fault state condition monitoring data comprises infrared image data and the plurality of fault state condition monitoring data comprises infrared image data, and wherein the transformation of the non-fault state condition monitoring data to the fault state condition monitoring data comprises the addition of the hot spot to the non-fault state infrared image.

9. The method according to claim 1, wherein the hot spot is added at a position within the non-fault state infrared image associated with a conductive part of an imaged object.

10. The method according to claim 1, wherein the received condition monitoring data comprises visible image data and the plurality of non-fault state condition monitoring data comprises visible image data and the plurality of fault state condition monitoring data comprises visible image data, and wherein the transformation of the non-fault state condition monitoring data to the fault state condition monitoring data comprises an addition of a scratch or dent to an object in a non-fault state visible image.

11. A fault state detection apparatus, comprising:

an input unit and a processing unit executing the method according to claim 1.

12. A method of training a machine learning algorithm for a fault state detection apparatus, the method comprising:

providing a plurality of non-fault state condition monitoring data and associated ground truth information;

providing a plurality of fault state condition monitoring data and associated ground truth information, the providing comprising generating a subset of the plurality of fault state condition monitoring data from one or more non-fault state condition monitoring data, and wherein the generating of fault state conditioning monitoring data in the subset of the plurality of fault state condition monitoring data comprises transforming non-fault state condition monitoring data to fault state condition monitoring data, wherein the transformation of the non-fault state condition monitoring data to the fault state condition monitoring data comprises adding a hot spot to a non-fault state infrared image, and wherein the hot spot is added at a random position within the non-fault state infrared image and alters the non-fault state infrared image;

implementing a machine learning algorithm;

training the machine learning algorithm on a basis of training data sets including the plurality of non-fault state condition monitoring data and the associated ground truth information and the plurality of fault state condition monitoring data and the associated ground truth information, wherein the training data sets mitigate imbalances between training data reflecting healthy operations and training data representing faulty operations;

receiving condition monitoring data comprising vibration data;

analyzing, by the trained machine learning algorithm, the received condition monitoring data to determine if the received condition monitoring data is associated with a fault state, wherein the plurality of non-fault state condition monitoring data comprises vibration data, the plurality of fault state condition monitoring data comprises vibration data, wherein the transformation of the non-fault state condition monitoring data to the fault state condition monitoring data further comprises increasing a vibration amplitude peak, wherein the non-fault state condition monitoring data are represented as a plurality of amplitudes in different frequency bins, wherein increasing the vibration amplitude peak comprises increasing an amplitude in one of the different frequency bins, and wherein the associated ground truth information of the plurality of fault state condition monitoring data includes a type of fault; and determining the type of fault that led to a respective fault state data of the plurality of fault state condition monitoring data.

* * * * *